(12) United States Patent
Skinner et al.

(10) Patent No.: US 6,529,737 B1
(45) Date of Patent: Mar. 4, 2003

(54) APPARATUS AND METHOD FOR SENDING A CUSTOMIZED MESSAGE TO A TELEPHONY SUBSCRIBER AND ESTABLISHING A DIRECT OPERATIVE CONNECTION THEREWITH WITHIN THE SAME TELEPHONE CALL

(75) Inventors: Francis Edward Skinner, Raleigh, NC (US); Patrick Lee Price, Fuquay-Varina, NC (US); Sherry Ann DeSoto, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/259,458

(22) Filed: Mar. 1, 1999

(51) Int. Cl.[7] ............................. H04Q 7/20; H04M 1/64; H04M 11/00
(52) U.S. Cl. .................. 455/466; 379/88.12; 379/88.18
(58) Field of Search .............................. 379/67.1, 88.12, 379/211.02, 211.03, 211.04, 211.05, 212.01, 215.01, 217.01, 88.18; 455/459, 458, 466, 412–417

(56) References Cited

U.S. PATENT DOCUMENTS

| | | | | |
|---|---|---|---|---|
| 5,794,142 A | * | 8/1998 | Vanttila et al. | ............. 455/414 |
| 6,160,995 A | * | 12/2000 | Kiswani et al. | ............. 455/33.2 |
| 6,230,019 B1 | * | 5/2001 | Lee | ............. 455/412 |
| 6,263,212 B1 | * | 7/2001 | Ross et al. | ............. 370/428 |
| 6,301,338 B1 | * | 10/2001 | Makela et al. | ............. 379/67.1 |
| 6,327,478 B1 | * | 12/2001 | Baker | ............. 455/466 |
| 6,333,973 B1 | * | 12/2001 | Smith et al. | ............. 379/67.1 |
| 6,424,841 B1 | * | 7/2002 | Gustafsson | ............. 455/417 |

* cited by examiner

*Primary Examiner*—Fan Tsang
*Assistant Examiner*—Joseph T. Phan
(74) *Attorney, Agent, or Firm*—Withrow & Terranova, P.L.L.C.

(57) ABSTRACT

An apparatus and a method for enabling the originator of a telephone call to send a customized message or signal to an unavailable telephony subscriber on a terminating telephone and to establish a direct operative connection therewith within the same telephone call. The apparatus and method include a Short Message Service device, typically operating in conjunction with a voice mail system and a call forwarding service, for providing the originator of a telephone call to the subscriber with the option of sending a short message to the subscriber's telephone in situations where the subscriber is unavailable. The subscriber may then send a response to the originator and/or choose to establish a direct operative connection therewith within the same telephone call and without requiring either party to place a separate telephone call.

15 Claims, 3 Drawing Sheets

APPARATUS AND METHOD FOR SENDING A CUSTOMIZED MESSAGE TO A TELEPHONY SUBSCRIBER AND ESTABLISHING A DIRECT OPERATIVE CONNECTION THEREWITH WITHIN THE SAME TELEPHONE CALL

FIELD OF THE INVENTION

The present invention relates to telecommunications systems and, more particularly, to sending a customized message or signal to a telephony subscriber having a telephone and selectively establishing a direct operative connection therewith within the same telephone call.

BACKGROUND OF THE INVENTION

A mobile network telephone subscriber having a mobile telephone has several factors to consider regarding the time spent using the telephone, concerns which are not typically shared by landline telephone subscribers. Mobile subscribers often buy airtime packages featuring a predetermined number of minutes of telephone use included in the cost of the package or, in the alternative, may pay by the minute for the use of the telephone. In a mobile network, airtime use is metered for all calls, even calls in the local calling area. For landline subscribers, the cost of a local call is often included in monthly phone service or carries a negligible charge, no matter how long the subscriber spends on the call. However, both landline and mobile subscribers must pay by the minute for long distance telephone calls. Thus, mobile and landline subscribers will sometimes closely monitor their use of their telephones or screen the calls that they will accept in order to contain costs. For example, subscribers closely monitoring their airtime may have their phone powered on, but may refuse to answer a telephone call if they are not expecting a call or do not know who is calling. However, even a landline or wireline subscriber may screen calls and refuse to answer a telephone call for similar reasons, typically to avoid wasting time on an unwanted call.

There are several alternatives for the telephony subscriber on a terminating telephone refusing to answer a telephone call in order to avoid wasting time on an unwanted call. For example, the subscriber may opt to include a voice mail feature in his telephone package. A feature such as voice mail is often combined with a call forwarding service which, for example, will route the originator's telephone call to voice mail if the subscriber's telephone is busy or the subscriber does not answer. Thus, for instance when the subscriber refuses to answer a telephone call, the caller is automatically routed to the voice mail system and prompted to leave a message. The subscriber can then review his messages in the voice mail system at a later time and can then decide whether to contact the person who previously called. In addition, the voice mail feature may be helpful in situations where the subscriber is already engaged in a call with a third party when a caller, also known as an originator, tries to place a call to the subscriber. Here, the originator is routed to the voice mail system and prompted to leave a message for the subscriber. The voice mail message serves as a notification for the subscriber that the originator had called while he was busy with the previous call.

Another alternative for the subscriber is to opt for a caller identification feature in his telephone package. The caller identification feature displays the name and/or the number of the incoming call on the terminating telephone for viewing by the subscriber. The subscriber, based on the identification of the caller, can then decide whether to accept the call. However, the caller identification feature is often not helpful to the subscriber. Depending on the terminal or telephone from which the originator is placing the call, the caller may be identified as "UNKNOWN," "PRIVATE," or "OUT OF AREA," for example. Further, even if a name and/or a telephone number do appear on the terminating telephone, these elements identify the particular originator's name and/or telephone number for the call-originating telephone and not the actual person making the call. This may be the case, for instance, where the person actually placing the call is using someone else's telephone. The name and/or telephone number of the person who owns the telephone and subscribes to the telephone service will be the caller identified on the terminating telephone, not the person actually placing the call. Thus, the subscriber may still refuse to accept the call if he cannot identify the originator thereof. In addition, while caller identification may be helpful in identifying the originator of an incoming call when the subscriber's telephone is idle (where the subscriber is not using the phone for a call), the caller identification feature will not be operable if the subscriber is already engaged in a call with a third party (presuming that the subscriber does not have a call waiting feature as described further below). The terminating telephone will not receive the identification of the caller and the originator will receive a prompt that the subscriber is unavailable or be routed to voice mail.

For situations where the subscriber is already engaged in a telephone call with a third party, he may opt to include a call waiting feature in his telephone package. When the originator places a call to the subscriber and the subscriber is busy on a telephone call to a third party, the call waiting feature sends a signal to the subscriber's telephone indicating the presence of the originator's call. The subscriber then has the option of connecting with the originator and releasing the third party or toggling between the originator and the third party. However, the signal that an originator is placing a call to the terminating telephone often consists of a beep, a tone, a click, or the like at the terminating telephone. Unless the subscriber has a caller identification feature, as described above, he will not know the identity of the originator. Further, even if the subscriber has a caller identification feature, he may still not know the identity of the actual originator of the call or why they are calling, as previously described for the caller identification feature. As such, the subscriber may still refuse to accept the call.

Still another alternative for the subscriber is to opt for a service which allows a short message to be sent by the originator to the subscriber's telephone. If the originator calls the subscriber and the subscriber is busy or does not answer, the originator is routed to a Short Message Service implementing a Short Message Service device. The originator can then enter a short message to be immediately sent to the terminating telephone by the SMS device. However, once the originator has entered the short message, the originator's telephone call will be terminated.

The short message comprises electronic data, such as a telephone number to which the originator wants the subscriber to respond. This electronic data is formed, for instance, by the originator entering the telephone number on the keypad of the telephone from which the originator is placing the call. Alternatively, the electronic data may be formed by a voice recognition system wherein the originator leaves a short voice message or oral communication for the subscriber which is converted into electronic data. The electronic data is then sent to the subscriber's telephone and is displayed as an alphanumeric message on the terminating telephone's display. The message could say, for example, "CALL YOUR WIFE AT 555-1234." In still another alternative, the originator may leave a message with a receptionist or operator who then enters the message in the Short Message Service. Once the subscriber receives the message on the display, he may then respond to the originator by placing a separate phone call thereto.

These various features and services may also be combined by the subscriber in one telephone package. For example, a subscriber may include caller identification and call waiting. Thus, if the subscriber is busy on a telephone call with a third party and the originator places a call to the subscriber, the originator's name and number may be displayed. However, the caller identification feature has shortcomings, previously described, which may lead the subscriber to refuse to accept the originator's call. In another example, a subscriber may include voice mail and the Short Message Service. Here, the originator can choose to leave a voice mail message for the subscriber to retrieve and respond to at a later time or to leave an immediate message for the subscriber via the short message feature. However, once the originator has entered the short message or has left a voice message, the originator's telephone call will be terminated. Thus, even if the subscriber gets the short message or the voice message immediately, the subscriber still has to place a separate call back to the originator to communicate therewith.

Further, from the originator's perspective, there may be instances where the originator needs to talk with the subscriber immediately. Encountering a busy signal (or caller unavailable prompt) or being routed to voice mail or the Short Message Service means that the originator must either keep calling back until the subscriber is no longer busy or leave a message for the subscriber for the subscriber to return the telephone call. These options often result in wasted time and/or frustration on the part of the originator. In addition, if the originator is not placing the call to the subscriber from a familiar phone or phone number, the subscriber with caller identification or caller identification with call waiting may still refuse to accept the originator's call. Thus, there exists a need for a more efficient and expedient system for contacting a telephony subscriber in instances in which the subscriber appears to be unavailable.

SUMMARY OF THE INVENTION

The above and other advantages are met by the present invention which includes an apparatus and a method for enabling the originator of a telephone call to send a customized message or signal to an unavailable telephony subscriber on a terminating telephone and to establish a direct operative connection therewith within the same telephone call. In particular, in situations where the subscriber is unavailable, the apparatus and method of the present invention provides an originator of a telephone call to the subscriber with the option of sending a short message to the subscriber's telephone. The subscriber may then send a response to the originator and/or choose to establish a direct operative connection therewith within the same telephone call.

According to the present invention, the originator first places a call to the subscriber, which is routed to the subscriber via a wireless, wireline, or an integrated wireless and wireline telecommunications switch. If the subscriber is unavailable when the originator places the telephone call, such as instances in which the terminating telephone is busy or the subscriber does not answer the telephone call, a call forwarding service routes the telephone call to a voice mail service. In the voice mail service, the originator is prompted to leave a voice message and/or a Short Message Service (SMS) message. If the originator opts to leave a voice message, a standard voice recording of originator's voice communication is recorded for later retrieval by the subscriber. If the originator chooses to leave an SMS message, the originator's telephone call is routed to the Short Message Service implementing an SMS device. Where the terminating telephone is currently unavailable, the SMS device is capable of receiving a customized SMS message from the originating telephone, sending the SMS message to the terminating telephone, receiving a response from the terminating telephone, and routing the response to the originating telephone. Accordingly, the terms Short Message Service, SMS device, and Short Message Service device are used synonymously herein in reference to these capabilities.

In the Short Message Service, the originator can form a customized short message to be sent to the subscriber's telephone. This short message, also known as an SMS message, is formed by the Short Message Service from input by the originator. The originator's input may include, for instance, a telephone number entered on the keypad of the originator's telephone. Alternatively, the Short Message Service may have a voice recognition feature which takes a voice communication input from the originator and forms the short message. In still another alternative, the originator may leave a message with a receptionist or operator who then enters the message in the Short Message Service. Once formed, the SMS message is sent to the terminating telephone by the SMS device. The alphanumeric SMS message is then displayed on a display of the terminating telephone and/or indicated to the subscriber in an alternative manner such as by an audio signal.

Where the subscriber is, for instance, screening calls, the subscriber is able to answer and accept the originator's telephone call. In this regard, the subscriber may have initially refused to accept the originator's call due to, for example, insufficient identification of the originator. By using the Short Message Service, however, the originator is then able to customize a message that is then sent to the subscriber. Once the SMS message is displayed or indicated to the subscriber, the subscriber can then decide whether to accept the call from the originator. If the subscriber decides to then accept the call, he merely answers the telephone. The originator's call is then processed by the telecommunications switch and a direct operative connection is formed between the originating telephone and the terminating telephone, enabling both parties to converse.

Where the subscriber is engaged in a telephone call with a third party prior to and during the originator's telephone call, there are several situations which are considered. If the subscriber has call waiting and/or caller identification services, the subscriber may initially refuse to accept the originator's call due to, for example, insufficient identification of the originator. On the other hand, if the subscriber does not have the call waiting feature, the originator will receive a busy signal and/or be routed to the voice mail system without the subscriber ever being aware of the originator's telephone call.

In either case, with or without call waiting, the originator is able to leave a voice message and/or an SMS message for the subscriber. If the originator opts to leave an SMS message, the customized SMS message is formed by the Short Message Service and sent to the subscriber's telephone where it is displayed or otherwise indicated to the subscriber. Although the subscriber is precedingly engaged in a telephone call with a third party, the subscriber is then able to decide whether to accept the call from the originator. In this situation, the subscriber can either ignore the SMS message from the originator or send a short message back to the originator indicating his intentions. The subscriber's response to the originator may include, for instance, acknowledging receipt of the SMS message and that the subscriber will establish contact with the originator at a later time, acknowledging receipt of the SMS message and that the originator should leave a voice message, and acknowledging receipt of the SMS message and that the subscriber will establish contact with the originator momentarily. These responses may be preprogrammed into the subscriber's telephone, the telecommunications switch, or the Short Message Service, requiring activation via a user interface on the terminating telephone.

If the originator's SMS message is ignored, the originator may remain with the telephone call and subsequently be routed back into the voice mail system after a predetermined time. The originator is also free to terminate the call at any time. If the subscriber's response is acknowledging receipt of said SMS message and that said originator should leave a voice message or if the originator is notified that the subscriber will contact him later, the originator is immediately routed back into the voice mail system. If, however, the subscriber responds that he will establish contact with said originator momentarily, the method and apparatus of the present invention allows the subscriber a predetermined time to terminate the call with the third party and to connect with the originator. In addition, the originator's telephone call is processed by the telecommunications switch to await connection with the terminating telephone. If the subscriber fails to connect with the originator within the predetermined time period, the originator is routed back into the voice mail system. However, where the subscriber timely terminates the call with the third party, a direct operative connection is formed between the originating telephone and the terminating telephone and both parties are able to converse within the same telephone call in which the originator sent the SMS message.

Thus, the present invention provides a more efficient and expedient system for contacting a telephony subscriber using a terminating telephone. The originator is provided with alternatives for directly contacting the subscriber during the same telephone call instead of having to call the subscriber back at a later time or having to wait for a return call from the subscriber. The present invention accomplishes this efficiency and expediency, in part, by using the customized message feature of the Short Message Service to positively identify the originator to the subscriber. The present invention then permits the subscriber to implement immediate and direct operative contact between the originator and the subscriber. The immediate and direct operative contact between the parties occurs during the original telephone call placed by the originator without requiring a separate telephone call by either party.

BRIEF DESCRIPTION OF THE DRAWINGS

Some of the advantages of the present invention having been stated, others will appear as the description proceeds, when considered in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the term "unavailable" refers to situations in which the subscriber does not actually receive or answer an incoming call and converse with the caller. The term "unavailable" includes situations where the terminating telephone is busy or idle, where the subscriber is ignoring the incoming call, and other like situations. For example, the subscriber may be unavailable where he is engaged in another call (the originator will receive a busy signal or will be routed to voice mail), where he is not within close enough proximity to answer the telephone, where he simply does not want to answer the incoming call, or where he has call waiting and chooses not to answer.

Figure 1:
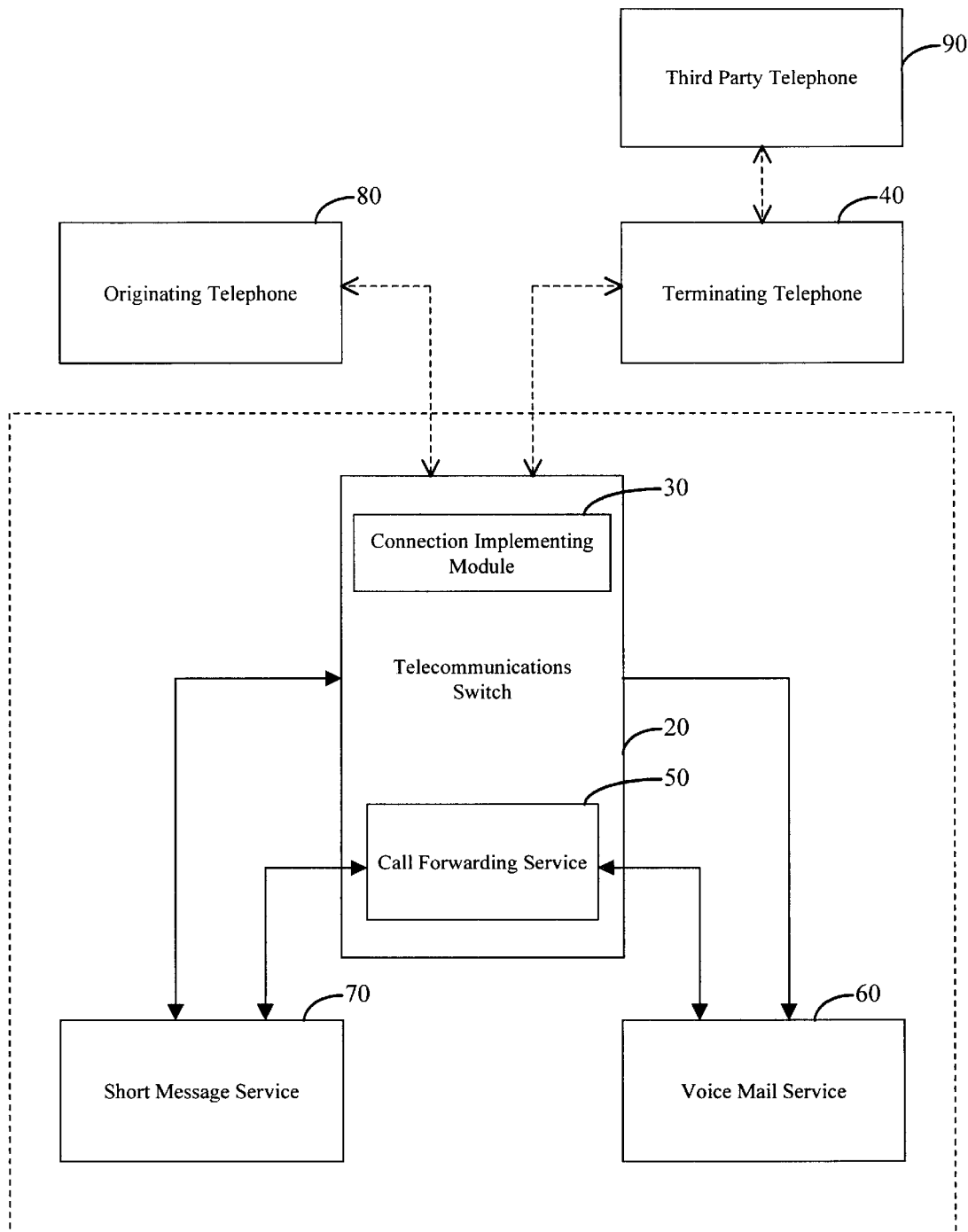
FIG. 1 is a block diagram of an apparatus according to one embodiment of the present invention.

Now referring to the drawings and, more particularly to FIG. 1, there is disclosed an embodiment of an apparatus for enabling the originator of a telephone call to send a customized message from an originating telephone to an unavailable telephony subscriber on a terminating telephone and to establish a direct operative connection therewith within the same telephone call, said apparatus indicated generally by the numeral 10, which includes the features of the present invention.

Apparatus 10 includes means for receiving a telephone call from an originating telephone, such as a telecommunications switch 20, wherein said means for receiving a telephone call is capable of communicably connecting the telephone call to a terminating telephone. The apparatus 10 also includes means for selectively establishing a direct operative connection between an originating telephone and a terminating telephone when said terminating telephone is not in an unavailable state, such as a connection implementing module 30 for connecting a telephone call placed by an originating telephone 80 to a telephony subscriber on a terminating telephone 40 in a telecommunications network. According to different embodiments of the present invention, the terminating telephone may take different forms. For instance, the terminating telephone may be a mobile telephone in a wireless telephony system. Alternatively, the terminating telephone may be a digital landline telephone operating over an ISDN protocol or an analog wireline telephone having a display and a messaging interface for indicating a message on the display. Each embodiment of the present invention may thus include different wireless or wireline telephones as the terminating telephone without departing from the spirit and essential character of the present invention.

According to the present invention, the subscriber's terminating telephone 40 has a telephone feature package which includes means for forming and sending an SMS message to a terminating telephone and receiving a response therefrom, such as a Short Message Service 70 and, in most instances, a call forwarding service 50 and a voice mail service 60. In situations where the terminating telephone 40 is unavailable, the originator of a telephone call from the originating telephone 80 to the terminating telephone 40 has the option of sending a short message to the terminating telephone, via such routes as a message channel and/or a traffic channel in a mobile telephony network or a data channel on an ISDN line, for indication to the subscriber. The subscriber may then use the terminating telephone 40 to send a response to the originating telephone 80 and/or to establish a direct operative connection therewith via the connection implementing module 30 and the telecommunications switch 20.

The telecommunications switch 20 may be a dedicated wireless network switch, a dedicated wireline or landline network switch, or an integrated switch adapted to both a wireless network and a wireline network. Examples of each type of switch are currently available, under the trade names DMS-MTX, DMS-100, and DMS-100 Wireless, respectively, and are produced by Northern Telecom, Inc., the assignee of the present invention. The telecommunications switch 20 communicably connects an incoming call from an originating telephone 80 to the party for whom the call is intended, the telephony subscriber on a terminating telephone 40 and, therefore, generally includes the connection implementing module 30. However, there may be situations where the terminating telephone 40 is unavailable to accept the telephone call from the originating telephone 80. For instance, the subscriber may be presently using the terminating telephone 40 to engage in a call with a third party telephone 90, the subscriber may be screening his calls and not answering the terminating telephone 40, or the subscriber may just not accept the call on the terminating telephone 40 if he cannot positively identify the originating telephone 80.

As shown in FIG. 1, once the originator places a call from the originating telephone 80 to the terminating telephone 40, the telecommunications switch 20 attempts to establish a connection with the terminating telephone 40. If the telecommunications switch 20 determines that the terminating telephone 40 is unavailable, the call forwarding service 50 routes the telephone call to the voice mail service 60 and/or the Short Message Service 70. Once in the voice mail service 60, the originator is prompted to leave a message. The originator may use the originating telephone 80 to leave a voice message and/or a Short Message Service (SMS) message. If the originator opts to leave a voice message, the voice mail service 60 records the originator's voice communication for later retrieval by the subscriber. If the originator chooses to leave an SMS message, the call forwarding service 50 routes the originator's telephone call to the Short Message Service 70 which implements an SMS device. Where the terminating telephone 40 is currently unavailable, the SMS device is capable of receiving a customized SMS message from the originating telephone 80, sending the SMS message to the terminating telephone 40, receiving a response from the terminating telephone 40, and routing the response to the originating telephone 80.

Once in the Short Message Service 70, the originator can use the originating telephone 80 to form a short message which is then sent to the terminating telephone 40. This short message, also known as an SMS message, is formed by the Short Message Service 70 from input from the originating telephone 80. The input may include, for instance, a telephone number entered on the keypad of the originating telephone. Alternatively, the Short Message Service 70 may have a voice recognition feature which takes the originator's voice communication input from the originating telephone 80 and forms the short message. In still another alternative, the originator may leave a message with a receptionist or an operator via the originating telephone 80, who then enters the message in the Short Message Service 70. Once formed, the SMS message is sent to the terminating telephone 40 by the SMS device through the telecommunications switch 20. The alphanumeric SMS message is then displayed on a display of the terminating telephone 40 and/or indicated to the subscriber in an alternative manner, such as by an audio signal.

By using the Short Message Service 70, the originator is able to use the originating telephone 80 to send a customized message or signal to the terminating telephone 40. Where the subscriber is, for instance, screening calls, the SMS message can be displayed or indicated on the terminating telephone 40 such that the subscriber is able to decide whether to accept the call from the originator 80. If the subscriber decides to then accept the call, he activates the terminating telephone 40 to do so. The originator's call is then processed by the telecommunications switch 20 and a direct operative connection is formed between the originating telephone 80 and the terminating telephone 40 by the connection implementing module 30, and both parties are able to converse.

Where the subscriber is using the terminating telephone 40 to engage in a telephone call with a third party telephone 90, the SMS message notifies the subscriber of the originator's telephone call and gives the subscriber the opportunity to decide whether to accept the call from the originator. In this situation, the subscriber can either ignore the SMS message from the originating telephone 80 or send a short message back to the originating telephone 80 indicating his intentions. The subscriber's response to the originator may include, for instance, acknowledging receipt of the SMS message and indicating that the subscriber will establish contact with the originator at a later time, acknowledging receipt of the SMS message and indicating that the originator should leave a voice message, and acknowledging receipt of the SMS message and indicating that the subscriber will establish contact with the originator momentarily. These responses may be preprogrammed into the terminating telephone 40, the telecommunications switch 20, or the Short Message Service 70, requiring activation via a user interface. The user interface may comprise, for instance, keys or buttons, or a sequence thereof, or a touch screen display, or the like on the terminating telephone 40.

If the originator is ignored by the subscriber, the originator may remain with the telephone call and the call forwarding device 50 will subsequently route the telephone call back into the voice mail system 60 after a predetermined time. If the subscriber responds that the originator should leave a voice message or the originator is notified that the subscriber will contact him later, the call forwarding device 50 immediately routes the telephone call back into the voice mail system 60. If the response indicates that the subscriber will establish contact with the originator momentarily, the apparatus and method of the present invention allows the subscriber a predetermined time to terminate the call with the third party telephone 90 and to connect with the originating telephone 80. In the meantime, the originator's telephone call is processed by the telecommunications switch 20. If the terminating telephone 40 sends this response and does not connect with the originating telephone 80 within the predetermined time period, the call forwarding device 50 routes the telephone call back into the voice mail system 60. However, where the subscriber timely terminates the call with the third party telephone 90, a direct operative connection is formed between the originating telephone 80 and the terminating telephone 40 by the connection implementing module 30 and both parties are able to converse.

Typically, the connection implementing module 30, the call forwarding device 50, and the Short Message Service 70 are implemented by a combination of hardware and software which are generally resident in the telecommunications switch 20. However, the connection implementing module 30, the call forwarding device 50, and the Short Message Service 70 can be implemented in other manners without departing from the spirit and scope of the present invention. For instance, the Short Message Service 70 may be resident elsewhere other than in the telecommunications switch 20, but still capable of performing the functions of the Short Message Service 70 detailed herein.

Figure 2A:
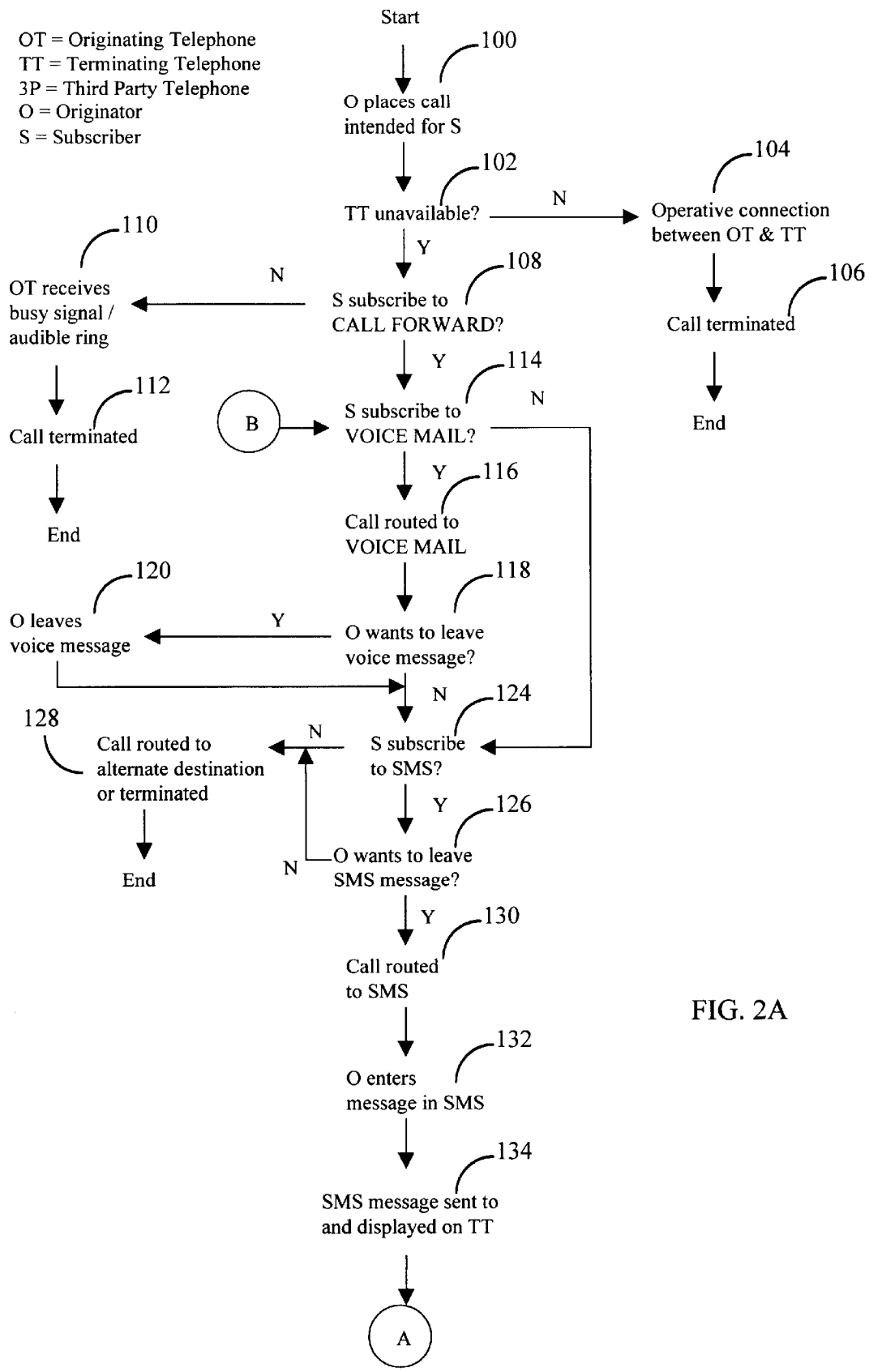
FIG. 2 is a flow diagram of the operations performed according to one embodiment of the present invention.
Figure 2B:
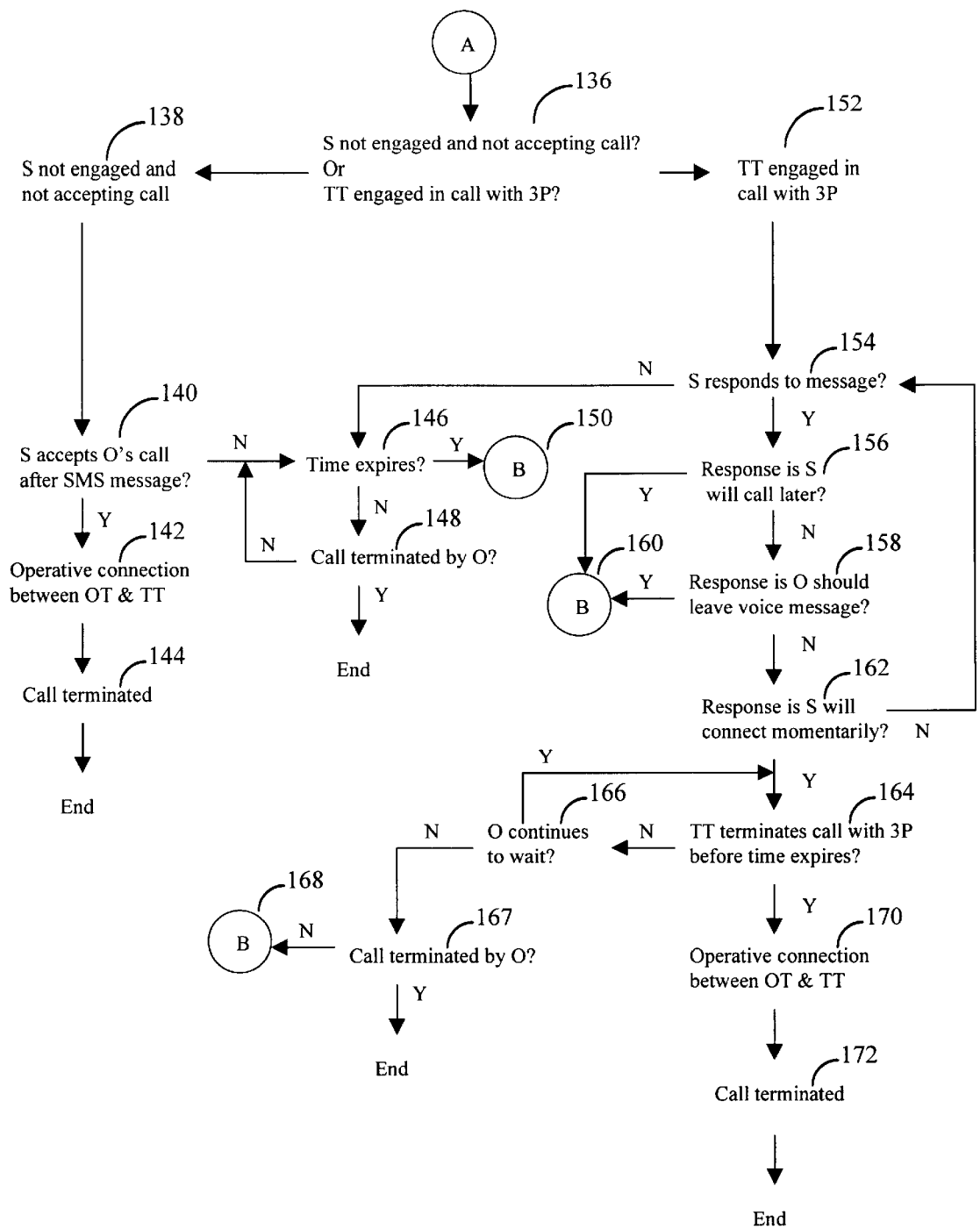

Now referring to FIG. 2, an embodiment of the method of the present invention is shown and begins with an originator placing a telephone call from an originating telephone intended for a telephony subscriber on a terminating telephone (block 100). After the telephone call reaches a telecommunications switch, the telecommunications switch determines whether the intended terminating telephone is unavailable (block 102). If the terminating telephone is not unavailable, an operative connection is established through the telecommunications switch (block 104) between the originating telephone and the terminating telephone. At this point, both parties may converse in a normal telephone conversation. The call continues until one of the parties terminates the telephone call and the connection ends (block 106). If the subscriber is using the terminating telephone to engage in a telephone call with a third party telephone or if the subscriber fails to accept the initial call, however, the telecommunications switch will determine that the terminating telephone is unavailable.

If the terminating telephone is unavailable (block 102), the telecommunications switch determines whether the subscriber also subscribes to a call forwarding service (block 108). If the subscriber does not have call forwarding in the telephone feature package for his telephone, the originating telephone will receive a busy signal or a continuing audible ring indicating that the subscriber is not answering the call (block 110) and the originator must terminate the call (block 112). If the subscriber does have call forwarding, however, the originator's call will be routed as dictated by the call forwarding service. For example, if the subscriber also subscribes to a call forwarding service (block 108), the telecommunications switch determines whether the subscriber also subscribes to a voice mail service (block 114). If the subscriber has a voice mail service (block 114), the originator's call is routed to the voice mail service (block 116).

Within the voice mail system, the originator is prompted to leave a voice message for the unavailable subscriber (block 118). If the originator opts to leave a voice message (block 118), the message is recorded by the voice mail service (block 120). Further, if the originator does not wish to leave a voice mail message (block 114) or after the originator has left a voice mail message (block 120), the voice mail system determines whether the subscriber also subscribes to a Short Message Service (block 124) for his telephone. If the subscriber does have a Short Message Service (block 124), the originator is also prompted to leave an SMS message for the subscriber (block 126) as an alternative or in addition to leaving a voice message. If the subscriber does not have a Short Message Service (block 124) or if the originator does not wish to leave an SMS message in the event that the subscriber does have a Short Message Service (block 126), the originator's call is routed to another telephone number or other telephony service consistent with the features of the call forwarding service or the call is terminated (block 128).

If the originator opts to leave an SMS message (block 126), the originator's call is routed to the Short Message Service (block 130) where the originator is prompted to enter a customized message to be sent to the terminating telephone (block 132) and indicated to the subscriber. The short message may be formed, for instance, by interpreting entries by the originator on the keypad or touch screen of the originating telephone, by a voice recognition device accepting a voice communication input from the originator, or by a receptionist or an operator taking a message from the originator. Once the short message is formed, it is entered in the Short Message Service, sent to the subscriber via the telecommunications switch, and displayed on the subscriber's telephone (block 134). The short message may, for example, be displayed on the terminating telephone's display and/or further indicated to the subscriber by some other visual cue or audio signal produced by the terminating telephone.

Once the SMS message has been sent to the subscriber, the Short Message Service determines the state of unavailability of the subscriber (block 136) from the subscriber's response to the SMS message. For instance, the subscriber may be in a state where he is not engaged in a call, but merely did not accept the original call or was engaged in a call when the originator's call first came in, but has since released the previous call (block 138). In this situation, if the subscriber decides to accept the originator's call after receiving the SMS message (block 140) and activates the terminating telephone to do so, the originator's call is processed by the telecommunications switch whereby the connection implementing module establishes a direct operative connection between the originating telephone and the terminating telephone (block 142). At this point, both parties may converse as in a normal telephone conversation. The call continues until one of the parties terminates the telephone call and the connection ends (block 144). However, if the subscriber decides not to accept the originator's call after receiving the SMS message and does not respond, the originator's call will remain in the Short Message Service in a "hold" period having a predetermined length of time (block 146). The hold period allows the subscriber time to respond to the SMS message via the terminating telephone. During the hold period, the originator may terminate the call (block 148). If the hold period expires without the subscriber accepting the call (block 146), the originator's call is routed back into the voice mail service (block 150), where the originator may leave a voice message and/or send another short message to the terminating telephone.

The direct operative connection between the originating telephone and the terminating telephone is a salient feature of the present invention in this situation. Normally, if an originator were to send a short message to the subscriber's telephone, the originator would then have to terminate the call and wait for the subscriber to return the telephone call. In this instance, the apparatus and method of the present invention allows the subscriber receiving the short message via his terminating telephone to establish an immediate and direct operative connection with the originator within the same telephone call used by the originator to send the SMS message.

Alternatively, the subscriber may be using his terminating telephone to engage in a call with a third party telephone (blocks 136 and 152) when the originator tries to contact the subscriber. In this situation, if the subscriber had additional services such as call waiting and/or conference calling, receiving an SMS message from an originator would assist in positively identifying the originator, in notifying the subscriber of the reason for the originator's call, or in relaying the originator's message to the subscriber. However, in conventional telephony systems, once the originator has entered the SMS message, the originator's telephone call is terminated. The apparatus and method of the present invention overcomes this shortcoming by allowing the subscriber to process the call accordingly with the services in his telephone feature package and establish a direct operative connection with the originating telephone within the same telephone call. For instance, if the subscriber wanted to converse with the originator after receiving the SMS message, the subscriber would be able to establish a direct operative connection with the originating telephone and toggle between the originating telephone and the third party telephone within the originator's same call (for the call waiting feature) or add the originating telephone into the existing call between the terminating telephone and the third party telephone (with the conference calling feature).

However, the present invention is particularly useful where the subscriber does not have the additional call waiting and/or conference calling services. Here, when the subscriber receives the SMS message on his terminating telephone from the originator, the subscriber may choose whether to respond to the originator (block 154) via the terminating telephone. The subscriber may have particular responses on his terminating telephone from which to choose. These responses may be preprogrammed into the terminating telephone, the telecommunications switch, or the Short Message Service and accessible by a combination of keys on the keypad of the telephone or by dedicated buttons or a touch screen or a like user interface on the telephone. The subscriber may choose from such responses as acknowledging receipt of the SMS message and indicating that the subscriber will establish contact with the originator at a later time, acknowledging receipt of the SMS message and indicating that the originator should leave a voice message, and acknowledging receipt of the SMS message and indicating that the subscriber will establish contact with the originator momentarily.

As before, after the SMS message has been sent to the terminating telephone, the originator's call will remain in a "hold" period having a predetermined length of time (block 146) for the subscriber to respond via the terminating telephone. During the hold period, the originator may terminate the call (block 148). If the hold period expires without the subscriber accepting the call (block 146), the originator's call is routed back into the voice mail service (block 150), where the originator may leave a voice message and/or send another short message to the terminating telephone. This procedure is followed if the subscriber chooses not to respond to the SMS message (block 154).

If the subscriber's response is that he will establish contact with the originator at a later time (block 156), or the originator should leave a voice message (block 158), the originator's call is routed back into the voice mail service (block 160), where the originator may leave a voice message and/or send another short message to the terminating telephone.

Where the subscriber responds that he will connect with the originator momentarily (block 162), the originator's call will be placed in a hold period having a predetermined time in order to allow the subscriber time to release and conclude his call with the third party telephone. If the subscriber has responded to the originator that he will be connected momentarily, but the hold period expires (block 164), the originator will be prompted whether he will continue waiting for the subscriber to establish a connection (block 166). If the originator opts not to extend the wait, he may terminate the call (block 167) or be routed back into the voice mail service (block 168), where the originator may leave a voice message and/or send another short message to the terminating telephone. If the originator opts to extend the wait, his call will be placed into another hold period. However, if the subscriber terminates his call with the third party telephone within the hold period after responding to the SMS message (block 164), the originator's call is processed by the telecommunications switch whereby the connection implementing module establishes a direct operative connection between the originating telephone and the terminating telephone (block 170). At this point, both parties may converse as in a normal telephone conversation. The call continues until one of the parties terminates the telephone call and the connection ends (block 172).

While the apparatus and method have been described herein in conjunction with a telephony subscriber having a terminating telephone in which the telephone feature package includes a voice mail service which is capable of routing the originator's call to the Short Message Service, the apparatus and method need not include a voice mail service. Without the voice mail service, the call forwarding service could route the originator's call directly to the Short Message Service, if so desired.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A telephony system for enabling an originator of a telephone call on an originating telephone to send a customized message to a telephony subscriber on a terminating telephone and selectively establish a direct operative connection therewith within the same telephone call, said system comprising:

a telecommunications switch for receiving a telephone call from an originating telephone intended for a telephony subscriber on a terminating telephone, said telecommunications switch capable of being communicably connected with said terminating telephone;

a Short Message Service (SMS) device, operably connected with said telecommunications switch, for sending an SMS message to said terminating telephone if said telephony subscriber chooses not to receive said telephone call, said SMS device capable of receiving a customized SMS message from said originating telephone, sending said SMS message to said terminating telephone, said SMS device also capable of routing said response to said originating telephone;

a connection implementing module operably connected with said telecommunications switch, said connection implementing module capable of selectively establishing a direct operative connection between said originating telephone and said terminating telephone once said telephony subscriber chooses to receive said call such that said direct operative connection between said originating telephone and said terminating telephone is established within the same telephone call that was initially placed by said originating telephone;

a voice mail device operably connected with said SMS device and said telecommunications switch, said voice mail device capable of operating a voice mail service and interacting with said originating telephone, said voice mail device allowing said originator to use said originating telephone to select an option within said voice mail system; and a call forwarding device operably connected with said telecommunications switch, said voice mail device, and said SMS device and capable of routing said telephone call therebetween;

wherein said call forwarding device routes said telephone call from said telecommunications switch to said voice mail device after said telephony subscriber has chosen not to receive said telephone call;

wherein the option which said voice mail device allows said originator to choose is selected from the group consisting of leaving a voice message for said subscriber, sending an SMS message to said terminating telephone, terminating said telephone call, and reviewing said group of options; and wherein said call forwarding device routes said telephone call from said voice mail device to said SMS device upon selection of the option to send an SMS message to said terminating telephone.

2. A telephony system according to claim 1 wherein said voice mall device is capable of recording a voice message for subsequent replay by said subscriber.

3. A telephony system according to claim 1 wherein said SMS device forms an SMS message based upon input by said originator, wherein said input is selected from the group consisting of electronic data and oral communication.

4. A telephony system according to claim 3 wherein said SMS device transmits an SMS message to said terminating telephone, and wherein said terminating telephone is capable of establishing a direct operative connection with said originating telephone without responding to said SMS message by accepting said telephone call such that said telephone call is processed by said telecommunications switch and said connection implementing module establishes a direct operative connection between said originating telephone and said terminating telephone.

5. A telephony system according to claim 3 wherein said SMS device is capable of sending a response to said originating telephone, said response selected from the group consisting of acknowledging receipt of said SMS message and indicating that said subscriber will establish contact with said originator at a later time, acknowledging receipt of said SMS message and indicating that said originator should leave a voice message, and acknowledging receipt of said SMS message and indicating that said subscriber will establish contact with said originator momentarily.

6. A telephony system according to claim 5 wherein said call forwarding device routes said telephone call from said SMS device to said voice mail device when said response is a message acknowledging receipt of said SMS message and directing that a voice message should be left.

7. A telephony system according to claim 5 wherein, upon said SMS device sending a response to said originating telephone acknowledging receipt of said SMS message and indicating that said subscriber will establish contact with said originator momentarily, said telephone call is processed by said telecommunications switch such that, when said terminating telephone becomes available, said connection implementing module establishes a direct operative connection between said originating telephone and said terminating telephone.

8. A telephony system according to claim 7 wherein said call forwarding device routes said telephone call from said telecommunications switch to said voice mail service if said terminating telephone is still in use for a predetermined time after responding to said originator.

9. A telephony system according to claim 5 wherein said telephony system includes a plurality of preprogrammed responses activated through a user interface on said terminating telephone, said preprogrammed responses preprogrammed in a device selected from the group consisting of said terminating telephone, said telecommunications switch, and said Short Message Service.

10. A telephony system according to claim 5 wherein said call forwarding device routes said telephone call from said Short Message Service to said voice mail service when said terminating telephone has not responded to said SMS message within a predetermined time.

11. A method for enabling an originator of a telephone call on an originating telephone to send a customized message to a telephony subscriber on a terminating telephone and selectively establish a direct operative connection therewith within the same telephone call, said method comprising the steps of:

receiving a telephone call from an originating telephone intended for a telephony subscriber on a terminating telephone;

determining if said terminating telephone is in an unavailable state, said unavailable state selected from the group consisting of a state wherein said terminating telephone is already in use and a state wherein said telephone call is not accepted within a predetermined time;

providing a Short Message Service for enabling said originator to form a customized SMS message within said Short Message Service;

sending said SMS message to said terminating telephone for indication to said subscriber;

receiving a response from said terminating telephone, including, when said terminating telephone is unavailable since said terminating telephone is already in use, receiving a response by way of said Short Message Service, such response chosen by said subscriber from a plurality of preprogrammed responses and activated through a user interface on said terminating telephone, said preprogrammed responses preprogrammed in a device selected from the group consisting of said terminating telephone, said telecommunications switch, and said Short Message Service, said response selected from the group consisting of acknowledging receipt of said SMS message and indicating that said subscriber will establish contact with said originator at a later time, acknowledging receipt of said SMS message and indicating that said originator should leave a voice message, and acknowledging receipt of said SMS message and indicating that said subscriber will establish contact with said originator momentarily; and selectively establishing a direct operative connection between said originating telephone and said terminating telephone based on said response once said terminating telephone is in an available state.

12. A method according to claim 11 wherein the step of receiving a response from said terminating telephone includes routing said telephone call from said Short Message Service to a voice mail service when a response to said SMS message has not been received from said terminating telephone within a predetermined time.

13. A method according to claim 11 wherein the step of receiving a response from said terminating telephone includes, when said terminating telephone is unavailable since said telephone call has not been accepted within a predetermined time, establishing a direct operative connection with said originating telephone without responding to said SMS message by accepting said telephone call such that said telephone call is processed by said telecommunications switch and a direct operative connection is established between said originating telephone and said terminating telephone.

14. A method according to claim 11 wherein the step of receiving a response from said terminating telephone includes routing said telephone call to a voice mail device when said response is a message acknowledging receipt of said SMS message and directing that a voice message should be left.

15. A method according to claim 11 wherein the step of receiving a response from said terminating telephone includes routing said telephone call to a voice mail device if said terminating telephone is still in use for a predetermined time after responding to said originator.

* * * * *